Harvey Fleming,
Boring-Machine.

No. 75,891. Patented Mar. 24, 1868.

Witnesses
J.E. M. Bowen
J. Scheirlin

Inventor
Harvey Fleming
By Knight Bro
Attorneys

United States Patent Office.

HARVEY FLEMING, OF VIENNA, NEW JERSEY.

Letters Patent No. 75,891, dated March 24, 1868.

---

IMPROVEMENT IN WOOD-BORING MACHINES.

---

The Schedule referred to in these Letters Patent and making part of the same.

---

TO ALL WHOM IT MAY CONCERN:

Be it known that I, HARVEY FLEMING, of Vienna, in the county of Warren, and State of New Jersey, have invented a new and useful Improvement in Boring-Machines; and I do hereby declare the following to be a full, clear, and exact description of the same, reference being had to the accompanying drawings, which are made a part of this specification.

The subject of this invention is a boring-machine, having an auger mounted on a stationary frame, and a compound carriage, of which the one part has a motion parallel with the axis of the auger, to feed the stuff to the action thereof, while the other has also a motion at right angles to that of the former, to bring the different parts to be perforated successively in line with the auger. The carriage whose motion is confined to parallelism with the auger is the feeding-carriage, the other being the adjusting-carriage.

To facilitate and insure the more perfect operation of the machine, I have applied a stop to limit the motion of the hand-lever, which actuates the adjusting-carriage, so as to arrest the adjusting-carriage at regular intervals, for the purpose of boring the holes at regular distances from each other; but, as the auger and compound carriage are separate from and independent of each other, and the adjusting-carriage movable independently of as well as simultaneously with the feeding-carriage, the adjusting-carriage may be moved by one or a succession of impulses, thus enabling the holes to be bored at irregular as well as regular intervals.

Figures 2 and 3 are views of detached parts, hereinafter referred to.

Similar letters of reference indicate corresponding parts in the several figures.

Figure 1:
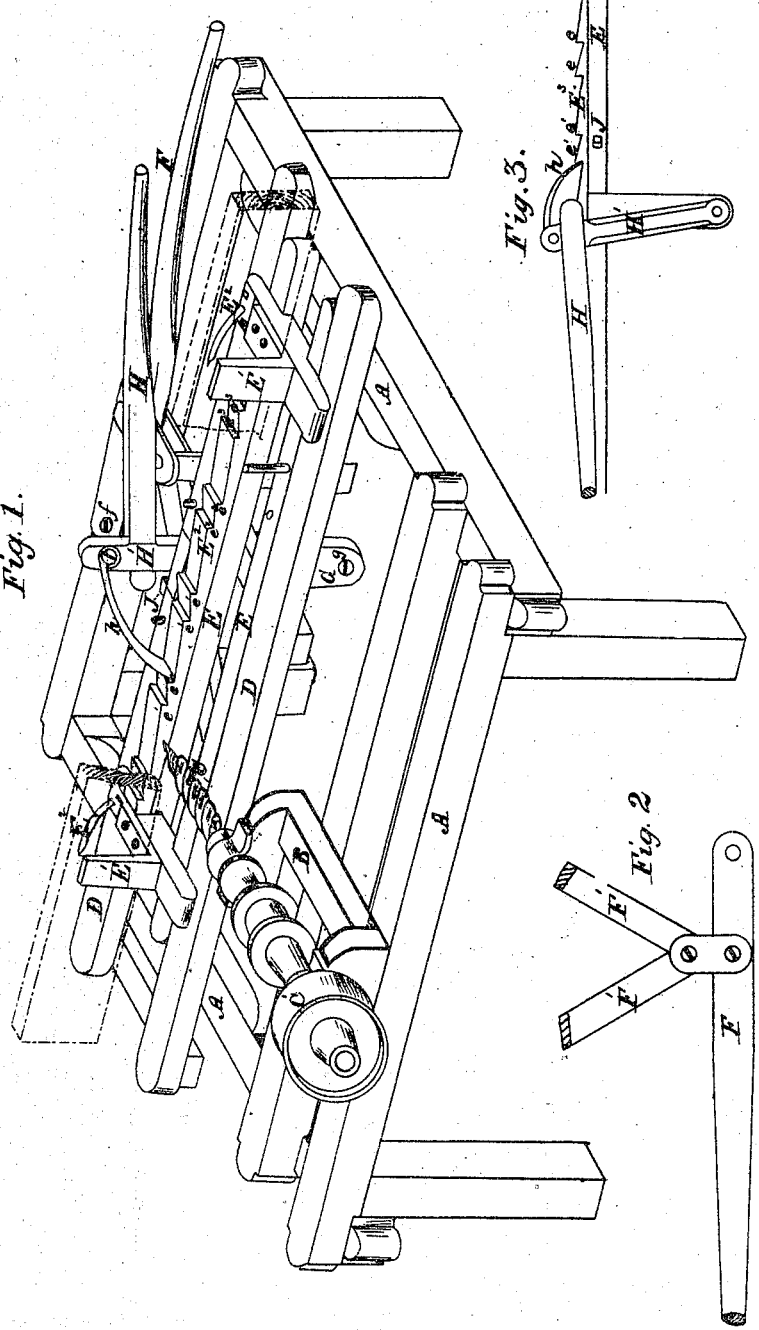
Figure 1 is a perspective view of my improved boring-machine.

In the drawings, A may represent a strong leg-supported rectangular frame, upon and at one side of which is permanently fixed the housing B of the bearings, which accommodate the spindle of the auger C. This auger may be rotated by a band from a horse-power, applied to the pulley C'. This is a very desirable means for operating the auger, but the same would not be available if the auger did not maintain one position.

D is the feeding-carriage, suitably supported and guided upon the frame A, to enable it to be moved toward or away from the auger C, parallel therewith, but in no other direction, in operation.

E is the adjusting-carriage, mounted upon the carriage D, and susceptible of a sliding motion at right angles to the auger, as well as receiving motion toward and away from the latter simultaneously with the feeding-carriage.

E E are knees, and $E^2 E^2$ are dogs, applied to the adjusting-carriage E, for the purpose of holding the log rigidly in the proper position.

$E^3$ is a bar, fixed to the upper side of one of the side-bars of the carriage E, and having upon its upper surface a series of shoulders, formed in pairs, $e\ e$, $e'\ e'$, &c., the shoulders of each pair, as well as the pairs themselves, being at a uniform distance apart.

Figure 2:
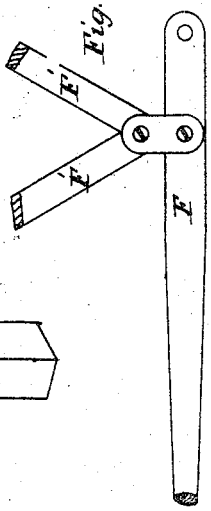

The log having been brought to the desired position by the adjustment of the carriage E, the latter, together with the carriage D, is moved up to the auger by means of the lever F, having its fulcrum at $f$, upon the frame A, and attached to the carriage D through the medium of the arms F' F', (see fig. 2.) By this lever, both carriages are also retracted from the auger when a hole has been bored.

Figure 3:
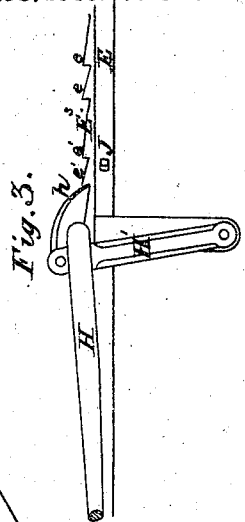

H H' is an angular lever, whose upright part H' (see fig. 3) is pivoted at $g$ to a bar, G, pendent from the carriage D, and carries a feed-hand, $h$, which acts upon the shoulders $e\ e'$, &c., as the lever H H' is vibrated, and thus gives that motion to the carriage E which brings the different parts of the log in line with the auger. The shoulders of each pair, say $e\ e$, space the two holes which determine the length of a mortise, in the formation of which the boring is the preliminary step. The vibrating motion of the lever H H', under which the carriage E is propelled, is limited by the fixed stop-pin J, projecting from the carriage D; so that the lever, by a single stroke, cannot be made to propel the log beyond a position in which the shoulder against which the feed-hand bears is in line with the auger. Thus, the first hole of a pair having been bored, one motion of the lever H H' and of the feed-hand $h$ propels the carriage E to an extent equal to the distance between the two shoulders of that pair. In order to engage one of the shoulders of a succeeding pair, say $e'\ e'$, the lever H H' has to be retracted to an extent corresponding with the distance between the pairs, or between the mortises, and then, when the propelling motion is given to the lever, it propels the carriage and log a distance corresponding with that to which the lever was retracted, the log being stopped in proper position for the boring of the first hole of the new mortise by the contact of the impelling-lever with the stop J.

It is obvious that, by advancing the feeding-carriage D to the auger C as often as the adjusting-motion of the carriage E is arrested, the holes will be bored in the post at points accurately corresponding with the shoulders on the adjusting-carriage. It is also manifest that, by continuing to propel the adjusting-carriage while the feeding-carriage is at rest, any number of the shoulders may be skipped, and hence the holes may be bored at irregular or variously-spaced points.

Having thus described my invention, what I claim as new, and desire to secure by Letters Patent, is—

With the stationary auger C, the carriages D and E, moving laterally and horizontally, the carriage E being movable simultaneously with and also independently of the carriage D, all constructed and arranged to operate substantially in the manner and for the purposes as set forth.

HARVEY FLEMING.

Witnesses:
ROBERT L. GARRISON,
COURSEN H. ALBERTSON.